United States Patent
Amit et al.

(10) Patent No.: US 10,871,974 B1
(45) Date of Patent: Dec. 22, 2020

(54) TARGET INJECTION SAFE METHOD FOR INLINING REGISTRATION CALLS

(71) Applicant: VMware, Inc., Palo Alto, CA (US)

(72) Inventors: Nadav Amit, Mountain View, CA (US); Frederick Joseph Jacobs, Los Gatos, CA (US); Michael Wei, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/746,731

(22) Filed: Jan. 17, 2020

Related U.S. Application Data

(60) Provisional application No. 62/871,573, filed on Jul. 8, 2019.

(51) Int. Cl.
| | |
|---|---|
| *G06F 9/44* | (2018.01) |
| *G06F 9/448* | (2018.01) |
| *G06F 9/38* | (2018.01) |
| *G06F 9/30* | (2018.01) |

(52) U.S. Cl.
CPC ........ *G06F 9/4486* (2018.02); *G06F 9/30065* (2013.01); *G06F 9/30101* (2013.01); *G06F 9/3836* (2013.01)

(58) Field of Classification Search
None
See application file for complete search history.

(56) References Cited

U.S. PATENT DOCUMENTS

| | | |
|---|---|---|
| 5,956,758 A | 9/1999 | Henzinger et al. |
| 6,763,104 B1 | 7/2004 | Judkins et al. |
| 8,312,249 B1 | 11/2012 | Trumbull |
| 8,340,262 B1 | 12/2012 | Cermak et al. |
| 8,406,384 B1 | 3/2013 | Tremblay et al. |
| 8,578,355 B1 | 11/2013 | Mars et al. |
| 10,698,668 B1 | 6/2020 | Pohlack et al. |
| 2004/0049667 A1 | 3/2004 | McCormick, Jr. et al. |
| 2005/0010804 A1 | 1/2005 | Bruening et al. |
| 2005/0032527 A1 | 2/2005 | Sheha et al. |
| 2010/0039495 A1 | 2/2010 | Rahman et al. |
| 2012/0271615 A1 | 10/2012 | North |
| 2013/0024675 A1 | 1/2013 | Lovett et al. |
| 2013/0036464 A1 | 2/2013 | Glew et. al. |

(Continued)

OTHER PUBLICATIONS

Ayers et al., "Aggressive Inlining", PLDI '97 Proceedings of the ACM SIGPLAN 1997 conference on Programming language design and implementation, ACM SIGPLAN Notices, vol. 32, Issue 5, May 1997, pp. 134-145.

(Continued)

*Primary Examiner* — Craig C Dorais

(74) *Attorney, Agent, or Firm* — Kim & Stewart LLP

(57) ABSTRACT

A method of redirecting an indirect call in a callback list associated with a list of functions that are registered, includes the steps of: upon registering the list of functions, determining a list of function pointers, each of which corresponds to an address in an associated callback; for each function pointer in the list of function pointers, adding a direct call instruction to the registration trampoline corresponding to the associated callback of the function pointer; and upon invoking the associated callback of one of the function pointers in the list of function pointers, invoking the corresponding direct call instruction in the registration trampoline.

20 Claims, 7 Drawing Sheets

(56) References Cited

U.S. PATENT DOCUMENTS

| | | |
|---|---|---|
| 2013/0044869 A1 | 2/2013 | Citron et al. |
| 2013/0166886 A1 | 6/2013 | Sasanka et al. |
| 2015/0054910 A1 | 2/2015 | Offen et al. |
| 2018/0060209 A1 | 3/2018 | Kim et al. |
| 2020/0026519 A1* | 1/2020 | Sultana .................. G06F 9/3871 |
| 2020/0192668 A1 | 6/2020 | Newton et al. |

OTHER PUBLICATIONS

Ivan Baev "Profile-based Indirect Call Promotion", LLVM Developers Meeting, Oct. 2015, 19 pages. https://llvm.org/devmtg/2015-10/slides/Baev-IndirectCallPromotion.pdf.

Calder et al., "Reducing Indirect Function Call Overhead in C++ Programs", POPL 94 Proceedings of the 21st ACM SIGPLAN-SIGACT Symposium on Principles of Programming Languages, Jan. 1994, pp. 397-408.

Chen et al., "AutoFDO: Automatic Feedback-Directed Optimization for Warehouse-Scale Applications", CGO '16 Proceedings of the 2016 International Symposium on Code Generation and Optimization, ACM, Mar. 2016, pp. 12-23.

Jonathan Corbet, "Finding Spectre vulnerabilities with smatch", LWN.net, Apr. 20, 2018, 6 pages. https://lwn.net/Articles/752408/.

Intel Corporation, "Intel Analysis of Speculative Execution Side Channels", White Paper, Jan. 2018, 12 pages. https://newsroom.intel.com/wp-content/uploads/sites/11/2018/01/Intel-Analysis-of-Speculative-Execution-Side-Channels.pdf.

Intel Corporation. "Retpoline: A Branch Target Injection Mitigation", White Paper, Jun. 2018, 22 pages. https://software.intel.com/security-software-guidance/api-app/sites/default/files/Retpoline-A-Branch-Target-Injection-Mitigation.pdfsource=techstories.org.

Intel Corporation. "Speculative Execution Side Channel Mitigations", White Paper, May 2018, 23 pages. https://software.intel.com/security-software-guidance/api-app/sites/default/files/336996-Speculative-Execution-Side-Channel-Mitigations.pdf.

Holzle et al,. "Optimizing Dynamically-Dispatched Calls with Run-Time Type Feedback", PLDI 94 Proceedings of the ACM SIGPLAN 1994 Conference on Programming Language Design and Implementation, ACM SIGPLAN Notices, vol. 29, Issue 6, Jun. 1994, pp. 326-336.

Andi Kleen, "Add a text_poke syscall", LWN.net, Nov. 2013, 7 pages. https://lwn.net/Articles/574309/.

Koruyeh et al., "Spectre Returns! Speculation Attacks using the Return Stack Buffer", WOOT18 Proceedings of the 12th USENIX Conference on Offensive Technologies, USENIX, Aug. 2018, pp. 1-12.

Microsoft, "Mitigating speculative execution side channel hardware vulnerabilities", Microsoft Security Response Center, Mar. 15, 2018, 14 pages. https://msrc-blog.microsoft.com/2018/03/15/mitigating-speculative-execution-side-channel-hardware-vulnerabilities/.

Martin Giles, "At Least Three Billion Computer Chips Have the Spectre Security Hole", MIT Technology Review, Jan. 2018, 16 pages. https://www.technologyreview.com/s/609891/at-least-3-billion-computer-chips-have-the-spectre-security-hole/.

Josh Poimboeuf, "[Patch v2 0/4] Static calls", Linux Kernel Mailing List, Nov. 2018, 2 pages. https://lkml.org/lkml/2018/11/26/951.

Ryan Smith, "Intel Publishes Spectre Meltdown Hardware Plans: Fixed Gear Later This Year", AnandTech, Mar. 2018, 6 pages. https://www.anandtech.com/show/12533/intel-spectre-meltdown.

Paul Turner, "Retpoline: a software construct for preventing branch-target-injection", Google, 2019, 8 pages. https://support.google.com/faqs/answer/7625886.

David Woodhouse. "[Patch] x86/retpoline: Fill RSB on context switch for affected CPUs", Linux Kernel Mailing List, Jan. 2018, 3 pages. https://lkml.org/lkml/2018/1/12/552.

David Woodhouse, "[4.4, 13/53] x86/retpoline/entry: Convert entry assembler indirect jumps", Linux Kernel Mailing List, Jan. 2018, 4 pages. https://lore.kernel.org/patchwork/patch/876057/.

Robert L Bernstein, "Producing Good Code for the Case Statement", Software: Practice and Experience, vol. 15(10), Oct. 1985, pp. 1021-1024.

\* cited by examiner

TARGET INJECTION SAFE METHOD FOR INLINING REGISTRATION CALLS

CROSS-REFERENCE TO RELATED APPLICATION(S)

This application claims the benefit of U.S. Provisional Application No. 62/871,573, filed Jul. 8, 2019, which is incorporated by reference herein.

BACKGROUND

Modern microprocessors that perform branch predictions have been found to have security vulnerabilities due to their use of speculative execution. FIG. 1A depicts an example computer system 100 whose CPUs 118a-n may have these vulnerabilities and FIG. 1B depicts the architecture of CPUs 118a-n in more detail. Features of the architecture that give rise to the vulnerability are described in reference to FIG. 1B.

Referring to FIG. 1A, computer system 100 includes a user space 102 in which one or more user processes 104a-n run, each with one or more threads 106a-n, an operating system kernel 108 that may include one or more kernel processes 110a-n with threads 112a-n and a set of page tables 114 that map virtual address spaces of the user processes to physical memory. Operating system kernel 108 operates on behalf of the one or more user processes 104a-n by receiving system calls via a system call interface 111. Hardware 116 includes one or more CPUs 118a-n, RAM 124 in which programs and data can be stored and persistent storage 126 such as hard disk drives or solid-state drives.

Each CPU 118a-n includes a cache 128, 130, which may include a first-level, second-level, and optionally, a third-level cache. Each CPU 118a-n may also include one or more processing cores 120a-n, 122a-n. CPUs 118a-n are usually superscalar (i.e., multi-issue) and deeply-pipelined.

Referring to FIG. 1B, major sections of vulnerable CPUs 118a-n include a bus unit 152 which is connected to a system bus 150, a 1st level cache 154, a 2nd level cache 156 and an optional 3rd level cache 158, a front end section 160, an out-of-order execution core 162, a retirement unit 164, a set of general-purpose registers 168, and a branch target buffer (BTB) and branch prediction hardware unit 166.

Front-end section 160 includes fetch and decode logic 170 and an execution trace cache 172. Fetch and decode logic 170 pre-fetches instructions that are likely to be executed, fetches instructions that have not already been prefetched, decodes instructions into micro-operations (micro-ops), and stores the decoded instructions into an execution trace cache 172. Assisting execution trace cache 172 and fetch and decode logic 170 are BTBs and branch prediction hardware unit 166. Branch targets are predicted by CPUs 118a-n based on their linear addresses using the branch target buffers (BTBs).

Out-of-order execution core 162 employs dynamic execution, which incorporates three functions, (1) branch prediction, (2) detection of instructions that can be executed out-of-order, and (3) speculative execution of instructions. Speculative execution refers to the CPU's ability to execute instructions that lie beyond a conditional branch or an indirect call that has not been resolved. Executing instructions that lie beyond a conditional branch helps to keep the pipeline full and, if successful, improves the performance of CPUs 118a-n.

Retirement unit 164 receives results of the executed micro-ops from out-of-order execution core 162 and searches for completed instructions that have no data dependencies or unresolved branch predictions. When found, retirement unit 164 commits the results of these instructions to memory or general-purpose registers 168 in the order in which they were originally issued. Retirement unit 164 also keeps track of branches and sends updated branch target information to the BTBs in unit 166, which in turn assists fetch and decode logic 170.

However, the speculative execution of instructions mentioned above has side effects that can reveal private data to attackers if the speculative execution is incorrect, and the processor undoes the speculation. For example, if the pattern of memory accesses performed by such speculative execution depends on private data, the resulting state of data in 1st level cache 154 constitutes a side channel through which the attacker may be able to extract information about the private data using a timing attack, which attempts to discern the private data based on the timing of certain processing steps. Attacks of this type are called Spectre Variant 2.

To counter this type of attack, a code sequence called a 'retpoline' is employed in an operating system kernel 108, such as the Linux® kernel.

FIG. 2 depicts a flow of operation for a call to a retpoline. The retpoline code replaces a 'call % rax', which is an indirect call to the location that is computed and stored in the % rax register. In step 202, the retpoline code determines whether the contents of % rax are known (i.e., computed). If not, then a CPU 118a-n executes a 'pause' instruction in step 204 and an 'lfence' (load fence) instruction in step 206. The 'pause' instruction is used to release processor resources to a hardware simultaneous multithread (SMT) or to save power if no execution is needed. The 'lfence' instruction guarantees ordering between two loads and prevents speculative loads from passing the lfence.

When the contents of the % rax register become known, then CPU 118a-n pushes the contents of % rax onto the stack in step 208 and then executes a return in step 210 to the location that the top of the stack points to. Thus, the 'call % rax' instruction is converted into a return (ref) instruction to the location specified by % rax. The conversion from an indirect call instruction to a return instruction helps to counter a Spectre, Variant 2 type attack because the return uses a return stack buffer (RSB) instead of the BTB, which is thought to be vulnerable to the attack.

Although the retpoline defends against the Spectre, Variant 2 type attack, the retpoline may still be exposed to an attack, because in some cases, if the RSB is empty, the processor may use the BTB instead.

Other mitigation measures in new hardware or microcode can be employed. However, these mitigation measures only work when operating system kernel 108 runs on the new CPU hardware or microcode. If operating system kernel 108 is moved to older hardware (i.e., hardware or microcode lacking the mitigation measures), the mitigation measures in hardware or microcode are of no use.

Another mitigation technique is call promotion, in which an indirect call is promoted to a conditional direct call.

FIG. 3 depicts a flow of operations for promoting the indirect call. In step 302, CPU 118a-n compares the target address to the contents of the % eax register. If the result is zero, as determined in step 304, CPU 118a-n calls the target address directly in step 306. If the result is not zero, as determined in step 304, CPU 118a-n performs the indirect call on the % eax register in step 308.

While promoting indirect calls reduces the chance that a processor will miss-speculate an indirect call, the promotion is costly because code size is increased and performance is reduced if infrequently used target addresses are promoted. Other limitations include: being allowed only a limited number of target addresses to promote; and being unable to predict accurately the target addresses that should be promoted because likely target addresses are determined at compile time or through the use of a profiling tool that observes an instance of a kernel that may not be representative of a later released or modified kernel. Finally, the target addresses learned by a profiling tool requires recompiling operating system kernel 108 to include them. As kernels are distributed in binary form, recompiling operating system kernel 108 is not practical.

Even binary translators or just-in-time (JIT) compilers do not adequately address Spectre Variant 2 type attacks, especially in regard to execution of an operating system kernel.

Thus, retpolines and indirect call promotion both defend against Spectre, Variant 2 type attacks, but at a high cost. The retpolines approach comes at a high performance cost because the retpoline prevents speculative execution until the branch target address of the indirect call is determined. Call promotion comes at a high performance cost because code size is increased and because promotion occurs without regard to the dynamic behavior of the kernel leading to promotions of infrequently used target addresses.

Thus, it is desirable to have a solution to mitigate attacks, such as Spectre, Variant 2 type, of indirect calls but without defeating speculative execution and thus maintaining performance.

SUMMARY

A method of redirecting an indirect call in a callback list associated with a list of functions that are registered, according to an embodiment, includes the steps of: upon registering the list of functions, determining a list of function pointers, each of which corresponds to an address in an associated callback; for each function pointer in the list of function pointers, adding a direct call instruction to the registration trampoline corresponding to the associated callback of the function pointer; and upon invoking the associated callback of one of the function pointers in the list of function pointers, invoking the corresponding direct call instruction in the registration trampoline.

Further embodiments include a computer system configured to carry out one or more aspects of the above method, and a non-transitory computer-readable storage medium containing computer-readable code executable by one or more computer processors to carry out one or more aspects of the above method.

DETAILED DESCRIPTION

One or more embodiments described below provide "jump switches," which avoid the problems with both retpolines and indirect promotion and other mitigation measures. Jump switches are code fragments, which serve as trampolines for indirect calls, and trampolines are code fragments that redirect the CPU to a different code path. Jump switches are Spectre-aware in that if a jump switch cannot promote an indirect call, then the jump switch falls back to a mitigated indirect call, such as a retpoline or hardware or microcode that provides protection.

Embodiments of jump switches include a registration jump switch (RJS) and an instance jump switch (NJS).

Registering a callback function means arranging an external entity to call the callback function. In an operating system kernel, both event notifiers and filters register callback functions. An event notifier, such as a user return notifier, registers a list of functions/callbacks to inform user space programs of a kernel event such as a return to user space. A filter, such as a system call filter, registers a list of functions/callbacks to act as a gateway that restricts the system calls that a process is allowed to invoke. In these cases, the callbacks associated with the functions in the list are called from a call-site in a loop and are implemented as indirect calls, subject to speculative execution. A registration jump switch (RJS) is used to handle these callback lists.

Figure 1A:
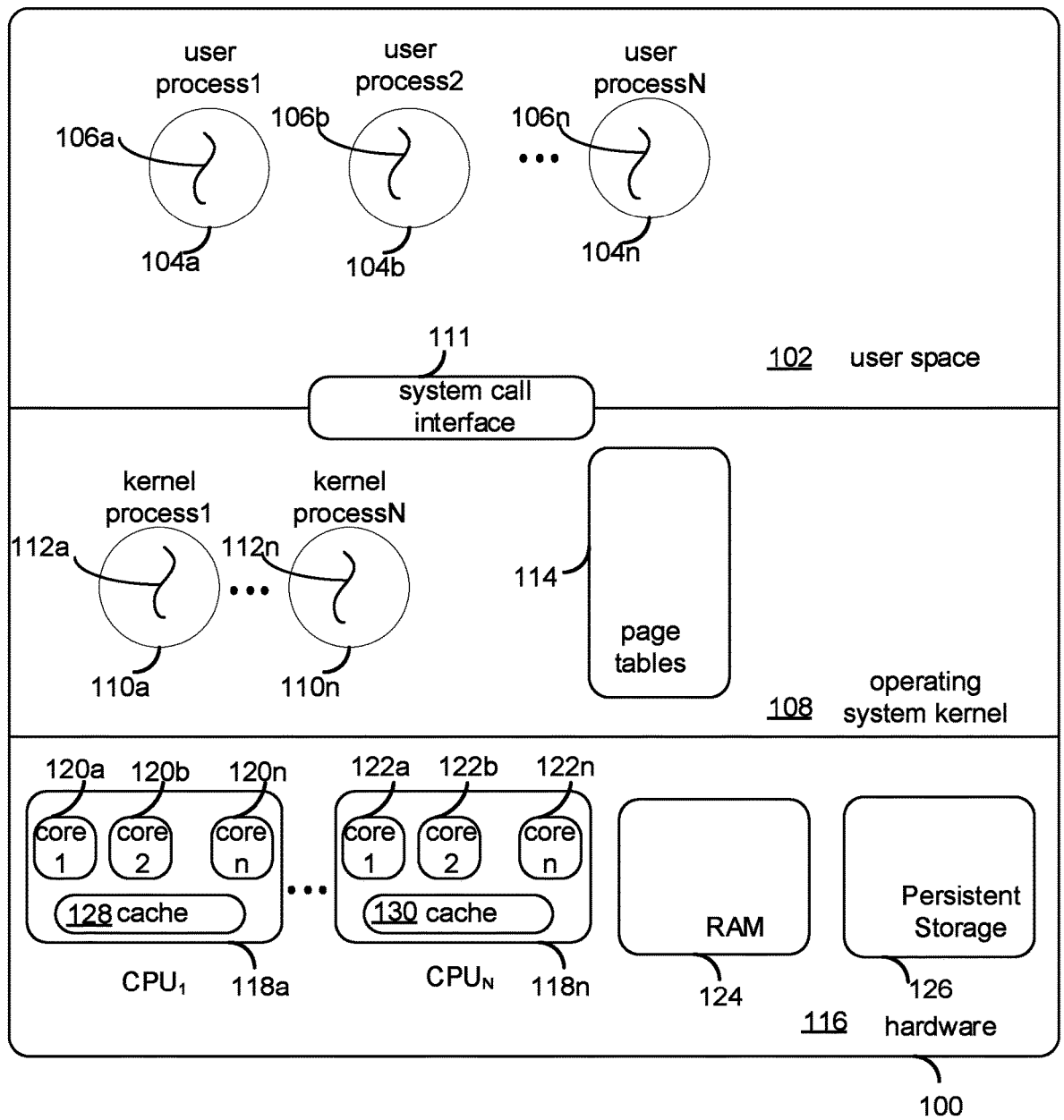
FIG. 1A depicts an example system whose CPUs may have these vulnerabilities.
Figure 1B:
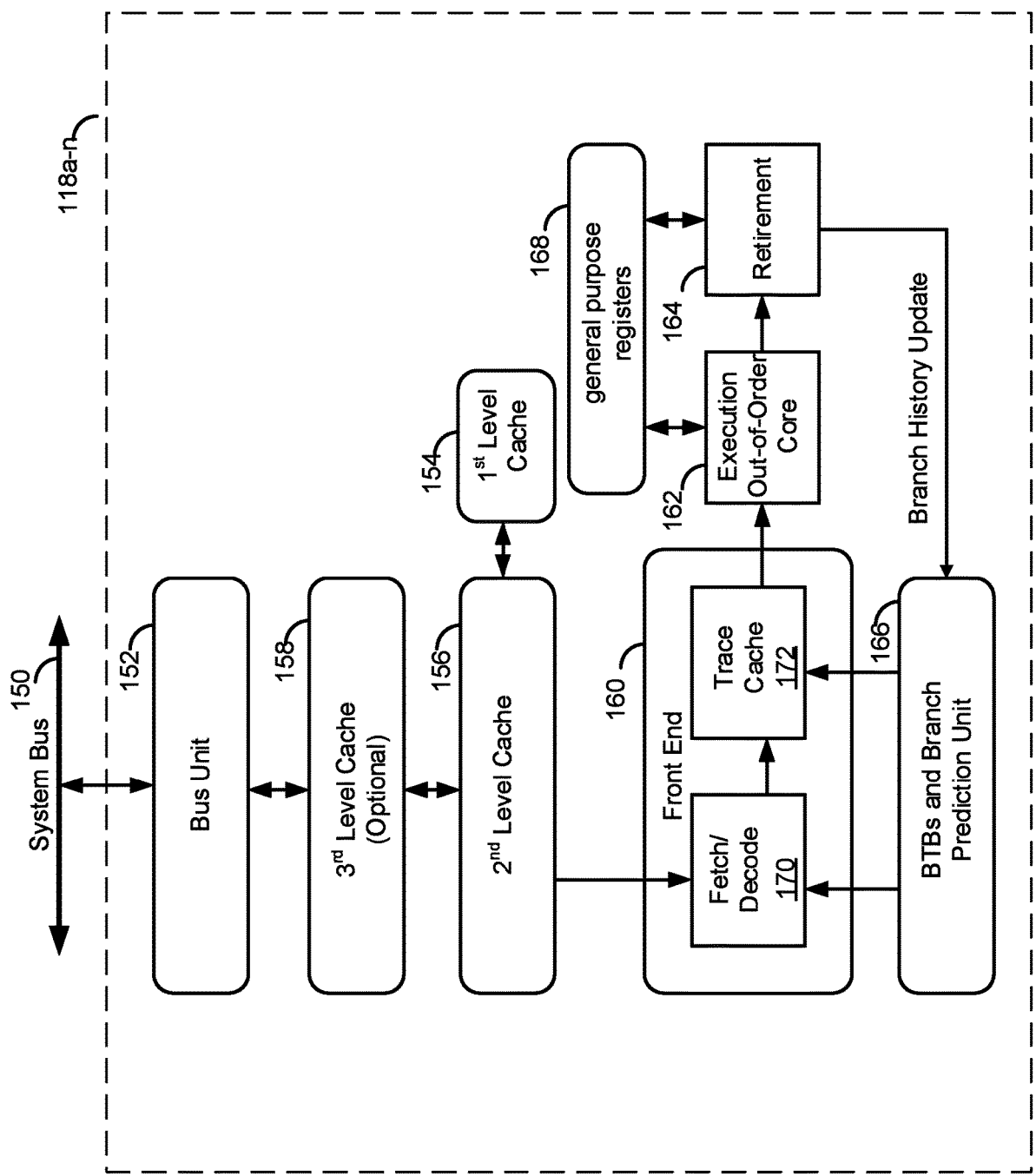
FIG. 1B depicts the architecture of the CPUs in more detail.
Figure 2:
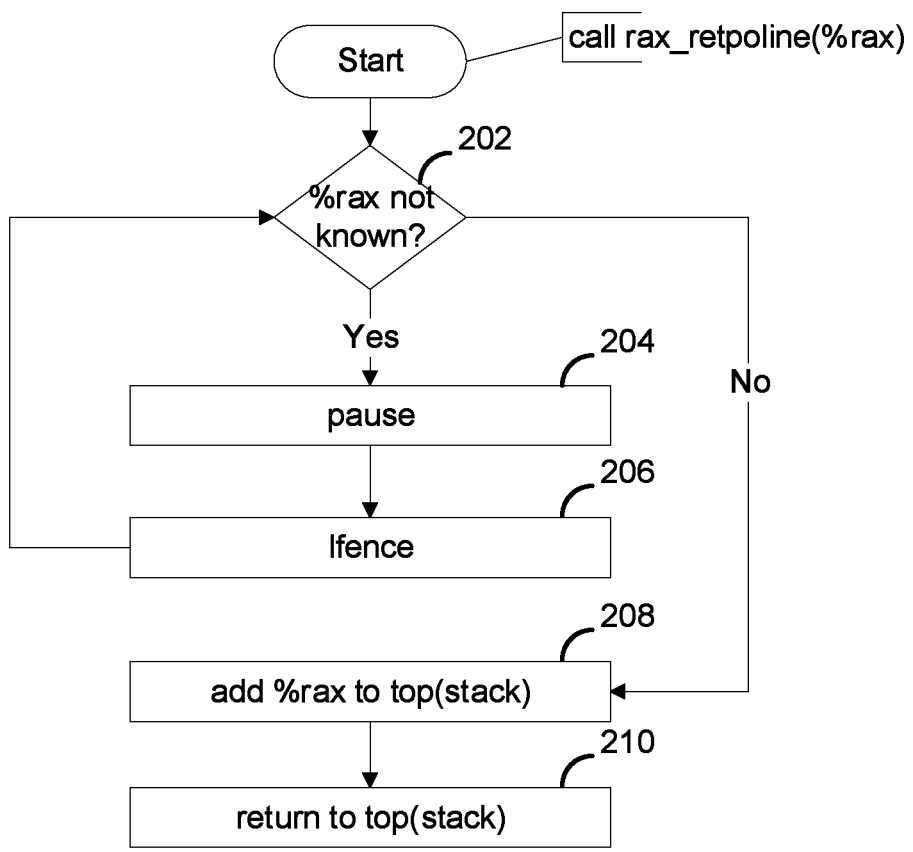
FIG. 2 depicts a flow of operations for a call to a retpoline.
Figure 3:
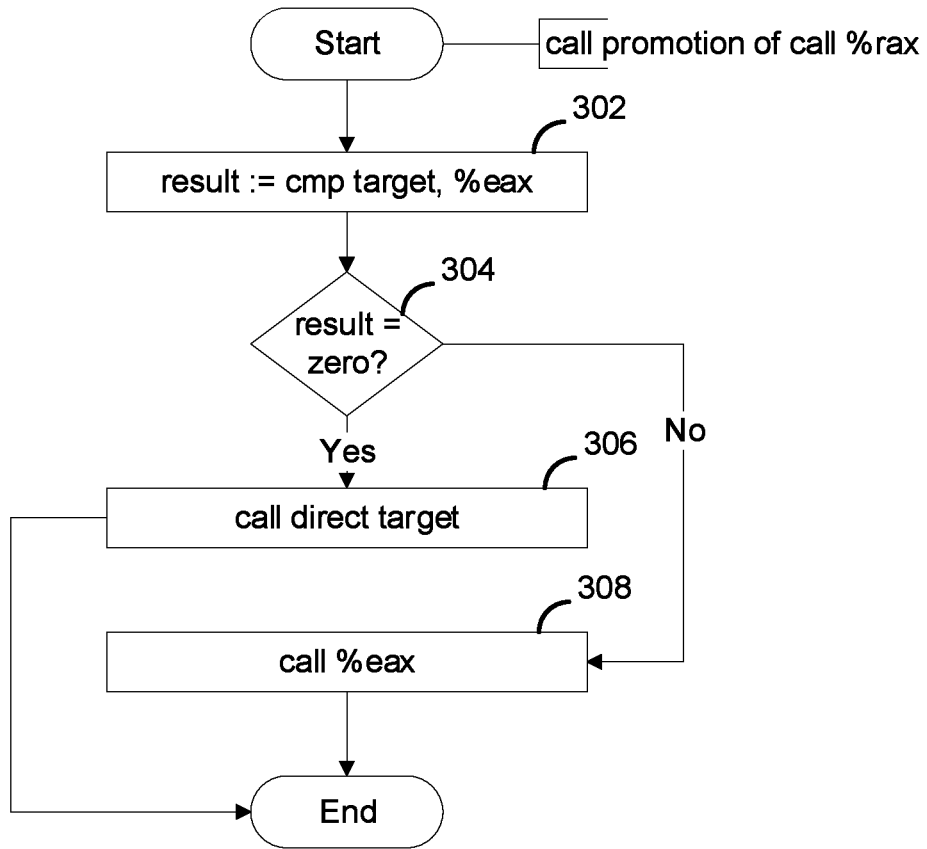
FIG. 3 depicts a flow of operations for indirect call promotion.
Figure 4A:
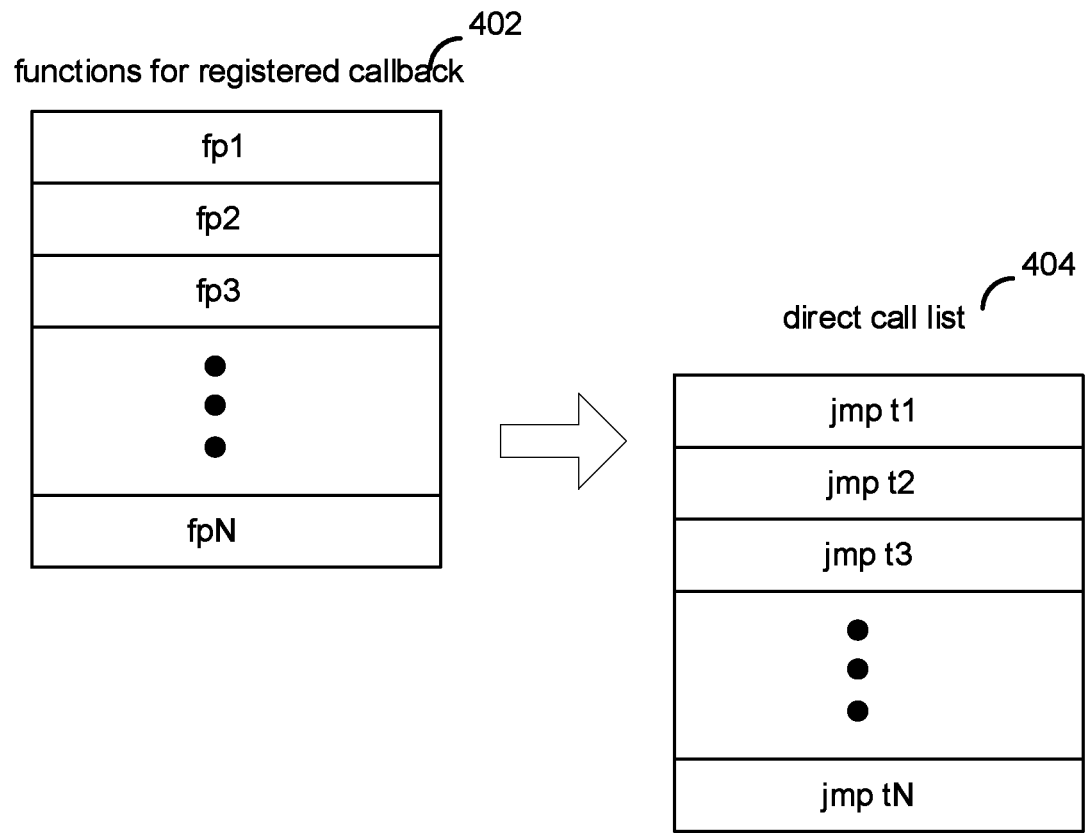
FIG. 4A depicts a list of functions for a registered callback and a direct call list formed from the registered callback.

FIG. 4A depicts a list of functions for a registration of an event notifier or filter and a direct call list formed from the registration. The event notifier or filter has a loop in which a list of target addresses of callbacks to functions are computed to implement the registration. List 402 depicts this list of target addresses to functions (i.e., function pointers fp1-N). The operating system kernel generates from list 402 a list 404 that contains a list of direct calls or jumps corresponding to each of the function pointers contained in list 402. List 404 is constructed in real-time (i.e., while the operating system kernel with registered callbacks is running) when a registration event occurs.

Figure 4B:
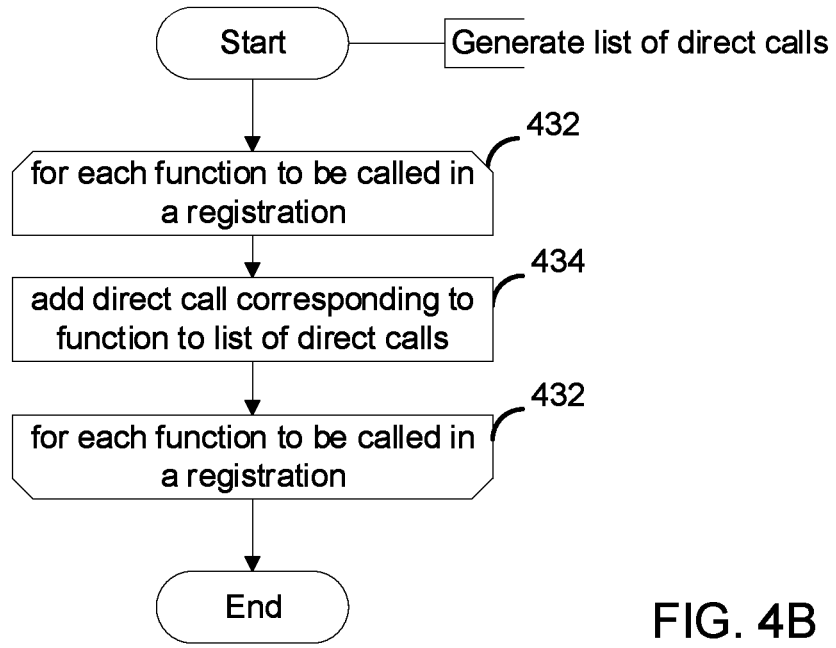
FIG. 4B depicts a flow of operations for generating a list of direct calls, in an embodiment.

FIG. 4B depicts a flow of operations for generating list 404 depicted in FIG. 4A, in an embodiment. In step 432, an iterator over the list of function pointers in the registration is established. For each function to be called in list 402, a direct call or a jump corresponding to the function pointer is added in step 434 to list 404 of direct calls or jumps.

Figure 4C:
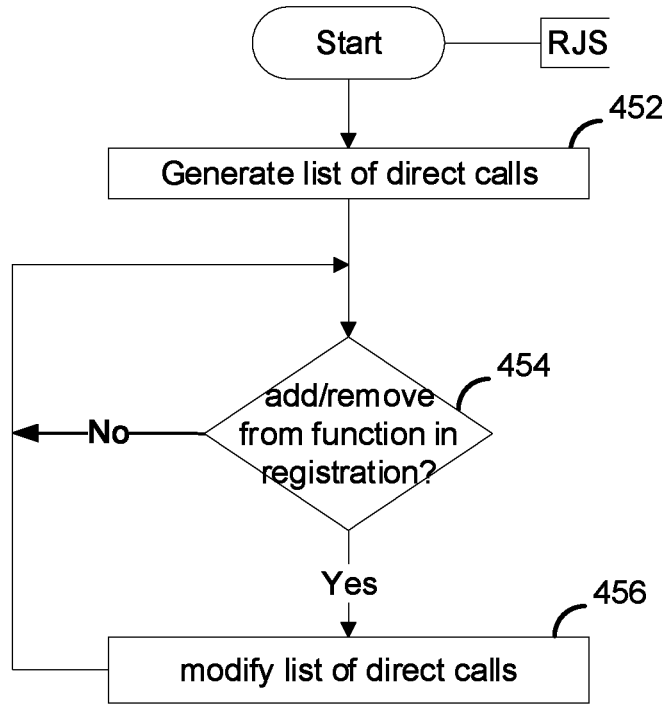
FIG. 4C depicts a flow of operations for a registration jump switch (RJS), in an embodiment.

FIG. 4C depicts a flow of operations for a registration jump switch (RJS), in an embodiment. In step 452, in response to a new registration event, RJS performs the function described in FIG. 4B to unroll the list of function pointers in the registration, the pointer of each function being the result of a computation in a loop, into a list of direct calls or jumps. In step 454, the RJS determines in real-time (i.e., while the kernel is running and in response to a registration event) whether a function is added or removed from the registration and in step 456 modifies (i.e., adds a direct call or jump to or removes a direct call or jump from) list 404 of direct calls or jumps. In addition, when any one of the functions in the original registration is invoked, execution is redirected to the corresponding direct call or jump in list 404.

In an embodiment, the RJS is implemented as an instance jump switch.

Figure 5:
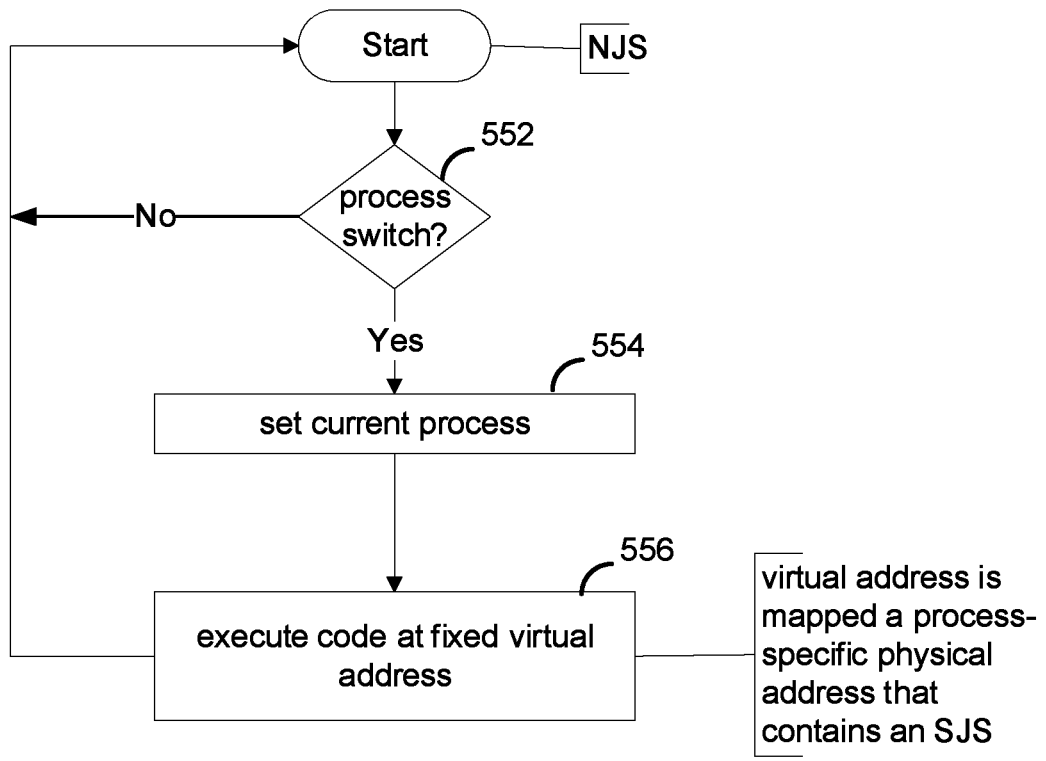
FIG. 5 depicts a flow of operations for an instance jump switch (NJS), in an embodiment.

FIG. 5 depicts a flow of operations for an instance jump switch (NJS), in an embodiment. An NJS, which is a memory region located in a code section of operating system kernel 108, correlates RJSs with a user process 104a-n. The correlation means that each user process 104a-n can have a different set of RJSs. Referring to FIG. 5B, upon a process switch to one of the user processes 104a-n by operating system kernel 108 as determined by step 552, the current process is set in step 554, for the switch. In step 556, CPU 118a-n executes the contents of the virtual address, which is mapped to a process-specific address that contains an RJS. For example, if the NJS resides at virtual address 0x1000 (hexadecimal 1000), and the RJS entry is mapped at a physical address of 0x20000, then the physical address at 0x20000+(0x1000*n), where n is the process number, gives the RJS to be executed. When operating system kernel 108 switches to process n, the virtual address '1000' will then implicitly point (i.e., act as an implicit pointer) to the physical address of the RJS. Thus, by use of the NJS residing in a memory code region of operating system kernel 108, the RJS becomes a process-specific jump switch.

Manual modification of the source code of a kernel, such as that for the Linux operating system kernel, is required to implement the RJS. The programmer manually replaces the registration system in the kernel with the RJS mechanism, and the registration jump switch targets are dynamically created during registration, as explained above.

Thus, implementation and use of the RJS allows for removing a significant source of indirect calls in a kernel, such as the Linux® kernel, reducing the likelihood of a Spectre Variant 2 attack. The further implementation of the RJS as an NJS allows for the RJS to operate as a process-specific RJS making the RJS tailored to each process.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of redirecting an indirect call in a callback list associated with a list of functions that are registered, to a direct call in a registration trampoline, the method comprising:

upon registering the list of functions, determining a list of function pointers, each of which corresponds to an address in an associated callback;

for each function pointer in the list of function pointers, adding a direct call instruction to the registration trampoline corresponding to the associated callback of the function pointer; and upon invoking the associated callback of one of the function pointers in the list of function pointers, invoking the corresponding direct call instruction in the registration trampoline.

2. The method of claim 1, wherein determining the list of function pointers includes unrolling a loop to expose the address in the associated callback.

3. The method of claim 1, wherein the list of function pointers is registered by an operating kernel.

4. The method of claim 1, wherein the list of function pointers is a filter list.

5. The method of claim 4, wherein the filter list is derived from a system call filter.

6. The method of claim 1, wherein the registration trampoline is implemented as an instance trampoline.

7. The method of claim 1, further comprising:

upon receiving a modification to the list of function pointers, updating an address associated with the modification in the direct call instruction in the registration trampoline corresponding to the modification.

8. A system comprising:
a memory containing one or more user processes, and
an operating system kernel having a memory code region that has a different mapping for each user process; and
one or more CPUs coupled to the memory, the one or more CPUs running the operating system kernel and the one or more user processes;
wherein the operating system kernel is configured to:
upon registering a list of functions, determine a list of function pointers, each of which corresponds to an address in an associated callback;
for each function pointer in the list of function pointers, add a direct call instruction to the registration trampoline corresponding to the associated callback of the function pointer; and
upon invoking the associated callback of one of the function pointers in the list of function pointers, invoke the corresponding direct call instruction in the registration trampoline.

9. The system of claim 8, wherein the operating system kernel determines the list of functions by unrolling a loop to expose the address in the associated callback.

10. The system of claim 8, wherein the list of function pointers is a filter list.

11. The system of claim 10, wherein the filter list is derived from a system call filter.

12. The system of claim 8, wherein the search trampoline is implemented as an instance trampoline.

13. The system of claim 8, wherein
the operating system kernel, upon receiving a modification to the list of function pointers, updates an address associated with the modification in the direct call instruction in the registration trampoline corresponding to the modification.

14. A non-transitory computer-readable medium comprising instructions executable in a computer system, wherein the instructions when executed in the computer system cause the computer system to carry out a method of redirecting an indirect call in a callback list associated with a list of functions that are registered, to a direct call in a registration trampoline, the method comprising:
upon registering the list of functions, determining a list of function pointers, each of which corresponds to an address in an associated callback;
for each function pointer in the list of function pointers, adding a direct call instruction to the registration trampoline corresponding to the associated callback of the function pointer; and
upon invoking the associated callback of one of the function pointers in the list of function pointers, invoking the corresponding direct call instruction in the registration trampoline.

15. The non-transitory computer-readable medium of claim 14, wherein determining the list of function pointers includes unrolling a loop to expose the address in the associated callback.

16. The non-transitory computer-readable medium of claim 14, wherein the list of functions is registered by an operating kernel.

17. The non-transitory computer-readable medium of claim 14, wherein the list of function pointers is a filter list.

18. The non-transitory computer-readable medium of claim 17, wherein the filter list is derived from a system call filter.

19. The non-transitory computer-readable medium of claim 14, wherein the registration trampoline is implemented as an instance trampoline.

20. The non-transitory computer-readable medium of claim 14, wherein the method further comprises:
upon receiving a modification to the list of function pointers, updating an address associated with the modification in the direct call instruction in the registration trampoline corresponding to the modification.

\* \* \* \* \*